No. 769,344. PATENTED SEPT. 6, 1904.
R. HOLLAND.
HARVESTING MACHINE.
APPLICATION FILED MAY 14, 1904.
NO MODEL. 2 SHEETS—SHEET 1.

Richard Holland, Inventor

Witnesses
Jas. F. McCathran
B. G. Foster

By E. G. Siggers
Attorney

No. 769,344. PATENTED SEPT. 6, 1904.
R. HOLLAND.
HARVESTING MACHINE.
APPLICATION FILED MAY 14, 1904.
NO MODEL. 2 SHEETS—SHEET 2.
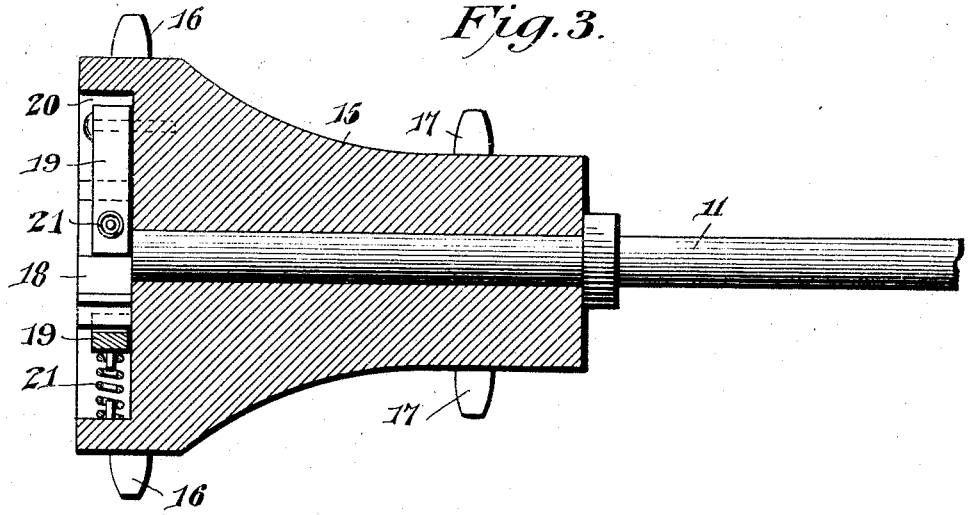
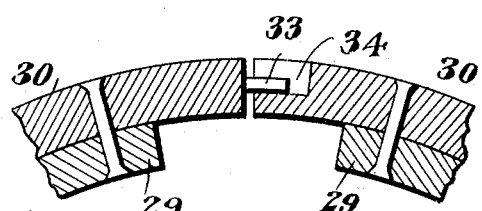
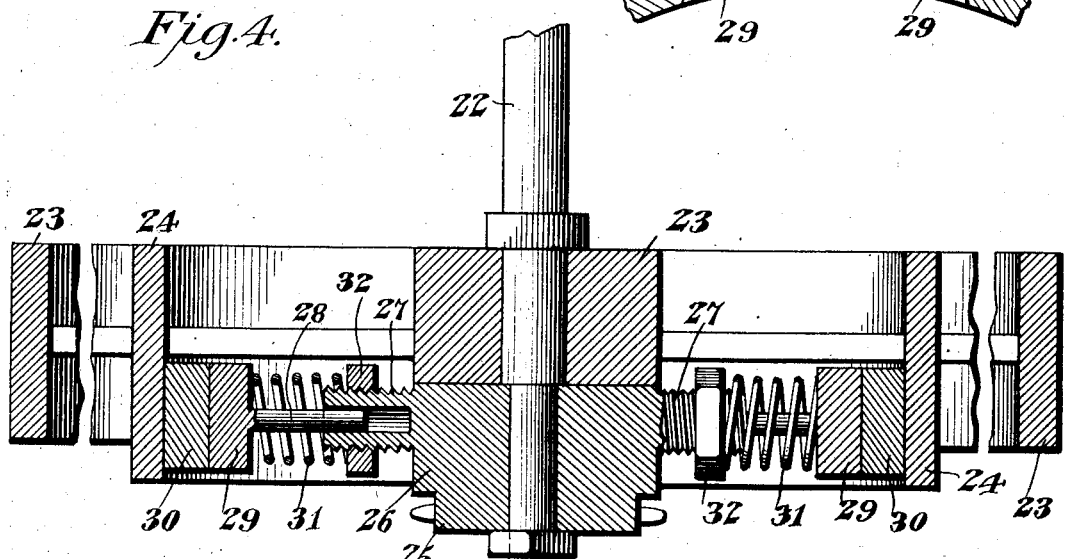
Richard Holland, Inventor
Witnesses No. 769,344. Patented September 6, 1904.

UNITED STATES PATENT OFFICE.

RICHARD HOLLAND, OF PIPESTONE COUNTY, MINNESOTA.

HARVESTING-MACHINE.

SPECIFICATION forming part of Letters Patent No. 769,344, dated September 6, 1904.

Application filed May 14, 1904. Serial No. 207,975. (No model.)

*To all whom it may concern:*

Be it known that I, RICHARD HOLLAND, a citizen of the United States, residing in the county of Pipestone and State of Minnesota, have invented a new and useful Harvesting-Machine, of which the following is a specification.

This invention relates to improvements in the means for operating the harvesting mechanism, and more particularly the aprons, elevators, and binding mechanism.

As is well known, the motion of the main driving or bull wheel is variable, and said wheel often comes to a stop, as when turning a corner or when it drops into a blind furrow. This ordinarily allows the stoppage of the entire mechanism, the motion of which is dependent upon the movement of said wheel, and thus the machine is left with the conveyers and binder full of grain. As a result when the machine is again started its mechanism is of necessity placed in operation under disadvantageous conditions, resulting in abnormal strain on the parts and undue draft on the animals.

To obviate this objection by novel and simple means, which can be readily applied to the usual styles of harvesters, is the principal object of the present invention. One structure by which this object is accomplished is illustrated in the accompanying drawings and is described in the following specification. It will be apparent, however, upon an inspection of the claims hereto appended that the invention is not limited to the details of construction shown and described and that the same may be varied to a considerable extent without departing from the spirit or scope of the invention.

Figure 1:
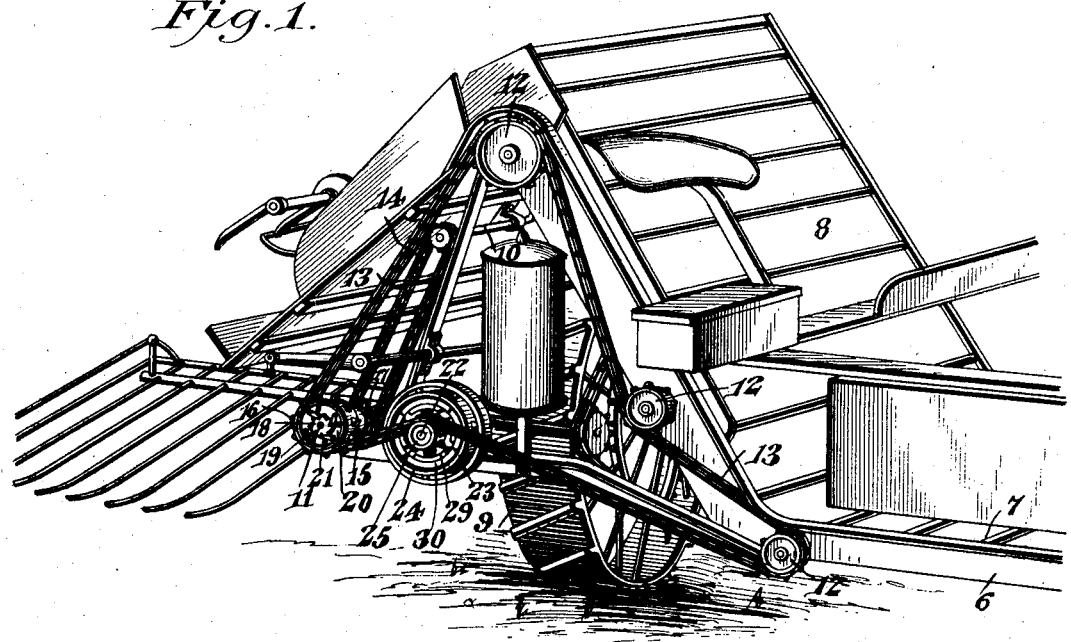
Figure 2:
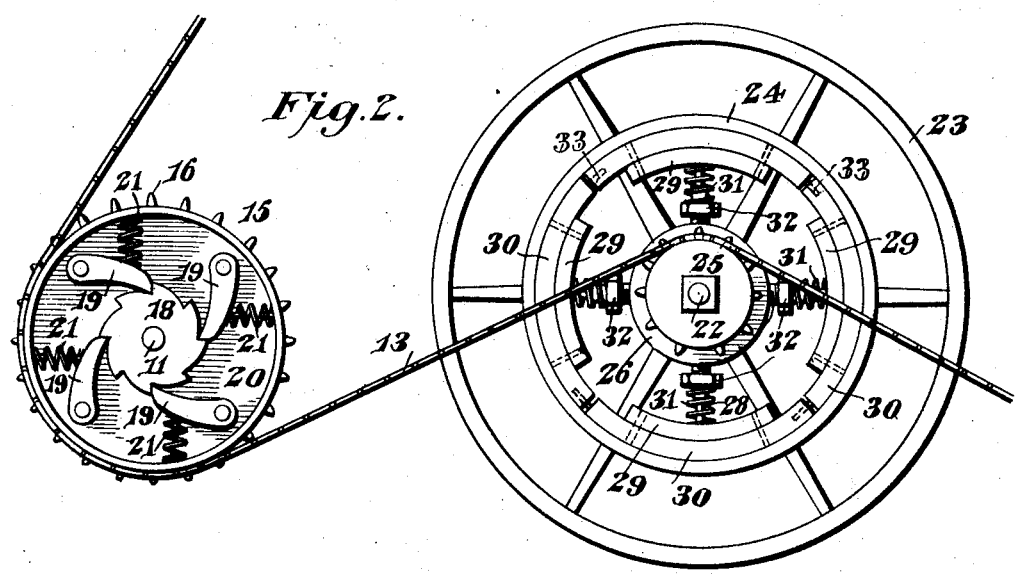

In the drawings, Figure 1 is a rear perspective view of a portion of a harvesting-machine, showing the improvements applied thereto. Fig. 2 is a view in elevation, on an enlarged scale, of the additional elements employed. Fig. 3 is a detail sectional view through the sprocket-wheel member applied to the driving or pitman shaft. Fig. 4 is a sectional view through the fly-wheel and sprocket-wheel associated therewith. Fig. 5 is a detail sectional view showing the form of joint preferably employed between the shoe members of the friction-clutch.

Similar reference-numerals indicate corresponding parts in all the figures of the drawings.

A portion of a well-known type of harvester is illustrated in Fig. 1, comprising a platform 6, over which operates an apron 7 and elevator 8, that extends over the main driving or bull wheel 9 and the usual binding mechanism, which includes a packer-shaft, designated generally by the reference-numeral 10. The main or bull wheel 9, as usual in this class of machines, constitutes the driver for the various mechanisms and is connected with a driving-shaft 11 in any suitable manner, said driving-shaft being the pitman-shaft, from which the cutter-bar is operated. The platform apron and elevators are driven by suitable shafts having sprocket-wheels 12, engaged by an endless chain 13, passing about the same. The packer-shaft may also be operated by a chain, as 14, engaging a sprocket-wheel thereof. So far as thus described the elements are well known and in themselves constitute no part of the present invention. They may be changed and varied as desired.

Said invention consists in the combination of the above with novel mechanism, one embodiment of which will now be described.

Loosely journaled on the rear end of the driving or pitman shaft 11 is a rotary member 15, having a large sprocket-wheel 16 and a small sprocket-wheel 17, constituting, preferably, integral parts thereof. This member has a clutch connection with the shaft 11, and said clutch connection constitutes a ratchet-wheel 18, secured to the rear end of the shaft 11 and constituting means for preventing the longitudinal movement of the member in one direction thereon. The teeth of said ratchet-wheel are engaged by dogs 19, pivoted to the rear end of the member 15 and located in a recess 20, formed in said end, which recess also receives the ratchet-wheel. The dogs are held in engagement with the wheel by coiled springs 21, located in the recess and having their outer ends bearing against the walls of the recess, while their inner ends bear against the dog, as shown in Fig. 2. The sprocket-chain 14, which engages the wheel of the packer-shaft 10, passes about and engages the sprocket-wheel 17 of the member 15. The sprocket-chain 13, that engages the various sprocket-wheels 12, passes about the sprocket-wheel 16. Thus power is transmitted to the chains 13 and 14 from the driving pitman-shaft 11 through the medium of the member 15 and its clutch connection.

Journaled on a spindle 22, located at one side of and parallel to the shaft 11, is a fly-wheel 23, having an annular bearing-flange 24 located within the periphery of said wheel and preferably projecting beyond one side of the same, as clearly illustrated in Fig. 4. A sprocket-wheel 25 is also journaled upon the spindle 22 outside the hub of the fly-wheel and has a hub 26, carrying threaded stems 27, which are hollow, as shown in Fig. 4. These stems have sockets or openings, as shown at the left-hand side of Fig. 4, that slidingly receive the spindles 28 of friction-jaws 29, to which are secured shoes 30, arranged to bear against the inner face of the flange 24, said shoes being yieldingly held in such engagement by springs 31, coiled about the spindles 28, their outer ends bearing against the jaws and their inner ends bearing against nuts 32, threaded on the stems. As shown in Fig. 5, the rotary movement of the shoes and jaws upon the spindles 28 as axes is prevented by connections between the shoes, said connections each consisting of a pin 33, carried by one end of one shoe and engaging in a socket 34, located in the adjacent end of the adjacent shoe. The chain 13 engages the sprocket-wheel 25.

The operation of the structure shown is substantially as follows: Assuming the entire mechanism at a state of rest, it will be apparent that when the machine is started motion will be imparted to the driving-shaft 11, and the sprocket-wheel member 15 will consequently be positively rotated, thereby effecting the movement of the chains 13 and 14 and the mechanism driven thereby with the exception of the fly-wheel. The inertia of this latter member being considerable, it will be apparent that the frictional clutch between the sprocket-wheel 25 and said fly-wheel will slip and that said fly-wheel will be gradually moved until the speed thereof equals the speed of the chain driving it. Thus undue strain from the inertia of the fly-wheel is prevented in starting the harvester. At the same time the strength of the frictional clutch can be changed as desired by adjusting the nuts 32 and varying the tension of the springs 31. It will also be clear that the power started in the fly-wheel will become effective to prevent the variableness of the driving power. Thus should the speed of pitman-shaft 11 suddenly decrease from any cause the sprocket-wheel member 15 will unclutch therefrom and the chains and mechanism be driven by the fly-wheel. Consequently in turning a corner or should the machine come to a full stop from any cause the conveying and binding mechanism will continue in operation for a sufficient length of time to permit the machine starting without the heavy load or strain of starting the entire mechanism, and, furthermore, this fly-wheel is preferably heavy enough to secure the operation of the conveyers and binding mechanism for a sufficient length of time to clear the aprons and bind the grain that may be thereon when the machine comes to a full stop. If, however, any part of said mechanism should become suddenly stopped from any cause, the friction-clutch between the sprocket-wheel 25 and the fly-wheel will permit the latter to rotate, and thereby avoid breakage from abnormal strains. Thus it will be seen that the object mentioned in the preliminary portion of the specification is secured by means which is simple, efficient, and novel.

Having thus described my invention, what I claim as new, and desire to secure by Letters Patent, is—

1. In a harvesting-machine, the combination with a driving-shaft, of harvesting mechanism including a conveyer, operative connections between the conveyer and driving-shaft including a clutch connection with said shaft, and a fly-wheel operated by and operating said connections.

2. In a harvesting-machine, the combination with a driving pitman-shaft, of harvesting mechanism, a clutch connection between the pitman-shaft and the harvesting mechanism, and a fly-wheel driven by said connection.

3. In a harvesting-machine, the combination with a driving pitman-shaft, of harvesting mechanism, a clutch connection between the pitman-shaft and the harvesting mechanism, and a fly-wheel driven by said connection and having a frictional clutch connection therewith.

4. In a harvesting-machine, the combination with a driving-shaft, of harvesting mechanism including a conveyer and binding mechanism, operative connections between the conveyer, the binding mechanism and the driving-shaft including a clutch connection with said shaft, and a fly-wheel operated by and operating said connections.

5. In a harvesting-machine, the combination with a shaft, of a member driven thereby and rotatably mounted at the rear end thereof, a clutch connecting the shaft and member, harvesting mechanism and a fly-wheel connected to and driven from said member.

6. In a harvesting-machine, the combination with a driving-shaft, of a member driven thereby and rotatably mounted on the rear end thereof, a clutch connecting the shaft and member, harvesting mechanism, a fly-wheel, and gear connections between the harvesting mechanism, the fly-wheel and the said member.

7. In a harvesting-machine, the combination with a pitman driving-shaft, of a gear-wheel loosely mounted on said pitman-shaft, a clutch connection between the gear-wheel and the pitman-shaft, harvesting mechanism including aprons and binding means, a fly-wheel, and gear connections between the gear-wheel, the harvesting mechanism and the fly-wheel.

8. In a harvesting-machine, the combination with a driving-shaft, of a sprocket-wheel having a clutch connection therewith, conveyer and binding mechanism having sprocket-wheels, a fly-wheel having a sprocket-wheel, and a sprocket-chain engaging said several sprocket-wheels.

9. In a harvesting-machine, the combination with a driving-shaft, of a sprocket-wheel having a clutch connection therewith, conveyer and binding mechanism having sprocket-wheels, a fly-wheel, a sprocket-wheel having a clutch connection with the fly-wheel, and a sprocket-chain engaging said several sprocket-wheels.

10. In a harvesting-machine, the combination with a pitman driving-shaft, of a member rotatably mounted on the rear end of the pitman-shaft and having a plurality of sprocket-wheels, a clutch connection between the driving-shaft and member, a packer-shaft having a sprocket connection with one of the wheels of the member, conveyer-aprons, means for operating the same including sprocket-wheels, a fly-wheel, a sprocket-wheel having a frictional clutch connection with the fly-wheel, and an endless sprocket-chain engaging the other sprocket-wheel of the member and the sprocket-wheels of the conveyer-aprons and fly-wheel.

In testimony that I claim the foregoing as my own I have hereto affixed my signature in the presence of two witnesses.

RICHARD HOLLAND.

Witnesses:
E. E. POWDERLY,
W. P. KILLALEE.